(12) United States Patent
Hull et al.

(10) Patent No.: US 9,509,204 B2
(45) Date of Patent: Nov. 29, 2016

(54) MOTION-DAMPING SYSTEMS BETWEEN BASE STRUCTURE AND AN ATTACHED COMPONENT AND METHODS INCLUDING THE SAME

(71) Applicant: The Boeing Company, Seal Beach, CA (US)

(72) Inventors: John Ralph Hull, Sammamish, WA (US); Michael Strasik, Sammamish, WA (US); Thomas H. Martig, Seattle, WA (US)

(73) Assignee: The Boeing Company, Chicago, IL (US)

( * ) Notice: Subject to any disclaimer, the term of this patent is extended or adjusted under 35 U.S.C. 154(b) by 416 days.

(21) Appl. No.: 14/104,992

(22) Filed: Dec. 12, 2013

(65) Prior Publication Data

US 2015/0167777 A1 Jun. 18, 2015

(51) Int. Cl.
*H02K 49/04* (2006.01)
*B64C 1/14* (2006.01)
(Continued)

(52) U.S. Cl.
CPC ............... *H02K 49/04* (2013.01); *B64C 1/14* (2013.01); *B64C 7/00* (2013.01); *B64C 9/02* (2013.01); *B64C 25/16* (2013.01); *F16F 15/03* (2013.01)

(58) Field of Classification Search
CPC ...... H02K 49/04; H02K 49/02; H02K 49/00; H02K 49/043; F16F 15/08; B64C 1/14; B64C 7/00; B64C 9/02; B64C 25/15
USPC ...................................... 310/105, 92, 91, 51
See application file for complete search history.

(56) References Cited

U.S. PATENT DOCUMENTS 4,624,435 A 11/1986 Freudenberg
5,039,047 A 8/1991 Pitzo
(Continued)

FOREIGN PATENT DOCUMENTS

DE 24 33 131 1/1976
DE 10227968 9/2003
(Continued)

OTHER PUBLICATIONS

Extended European Search Report for related application EP 14191500, Jun. 18, 2015.
(Continued)

*Primary Examiner* — Michael Andrews
(74) *Attorney, Agent, or Firm* — DASCENZO Intellectual Property Law, P.C.

(57) ABSTRACT

Motion-damping systems and methods that include motion-damping systems are disclosed herein. The motion-damping systems include a flexible body that is configured to extend within a gap that is defined between a base structure and an attached component. The motion-damping systems further include a magnetic assembly and a ferromagnetic body. One of the magnetic assembly and the ferromagnetic body is located within the flexible body and the other of the magnetic assembly and the ferromagnetic body is operatively affixed to a selected one of the base structure and the attached component. The magnetic assembly and the ferromagnetic body are oriented such that a magnetic force therebetween retains the flexible body in physical contact with the selected one of the base structure and the attached component. The methods include methods of installing and/or operating the motion-dampening systems.

18 Claims, 3 Drawing Sheets

(51) Int. Cl.
*F16F 15/03* (2006.01)
*B64C 7/00* (2006.01)
*B64C 9/02* (2006.01)
*B64C 25/16* (2006.01)
*F16F 15/08* (2006.01)

(56) References Cited

U.S. PATENT DOCUMENTS

| | | | |
|---|---|---|---|
| 5,465,815 A | 11/1995 | Ikegami | |
| 6,588,554 B2 | 7/2003 | Fujita et al. | |
| 2002/0017749 A1* | 2/2002 | Fujita | F16F 3/026 267/140.15 |
| 2003/0080246 A1 | 5/2003 | Koizumi et al. | |
| 2004/0061404 A1* | 4/2004 | Fujii | H02K 1/185 310/254.1 |
| 2006/0087192 A1* | 4/2006 | Norell | H02K 3/522 310/194 |
| 2007/0051576 A1 | 3/2007 | Shimoda et al. | |
| 2011/0254394 A1 | 10/2011 | Piaton | |
| 2013/0000991 A1 | 1/2013 | Scholz et al. | |
| 2015/0345134 A1 | 12/2015 | Takahashi et al. | |

FOREIGN PATENT DOCUMENTS

| | | |
|---|---|---|
| EP | 2472139 | 7/2012 |
| EP | 1 172 581 | 11/2015 |

OTHER PUBLICATIONS

English machine-translation of abstract of DE 10227968, downloaded from espacenet.org on Jun. 26, 2015.
Canadian Intellectual Property Office, Office action issued in related pending Canadian Patent Application No. 2,864,205, Nov. 25, 2015.
Machine-generated English translation of DE 24 33 131, downloaded from espacenet.com on Jan. 27, 2016.

* cited by examiner

MOTION-DAMPING SYSTEMS BETWEEN BASE STRUCTURE AND AN ATTACHED COMPONENT AND METHODS INCLUDING THE SAME

FIELD

The present disclosure is directed generally to motion-damping systems, and more particularly to motion-damping systems that are configured to damp relative motion between a base structure and an attached component.

BACKGROUND

A base structure may include an attached component that is configured to move (such as to rotate and/or translate) relative to the base structure. Under certain conditions, it may be desirable to damp relative motion and/or vibration between the base structure and the attached component.

As an illustrative, non-exclusive example, an aircraft may include external attached components, such as flaps, that may be configured to be actuated and/or moved relative to a remainder of the aircraft, such as during and/or to control flight of the aircraft. These external attached components may be subject to significant wind and/or drag forces during flight of the aircraft, and these forces may produce vibration and/or flutter of the external attached components. Flutter is a self-feeding, or resonant, condition in which the forces couple with a natural frequency of the external attached component, generating larger and larger amplitude vibrations between the external attached component and the aircraft.

Conventionally, aircraft include hydraulic dampers that may be utilized to damp relative motion of the external attached component. While these hydraulic dampers may be effective at damping relative motion and/or vibration, they may be complicated, heavy, and/or costly to implement and/or maintain. Thus, there exists a need for improved motion-damping systems.

SUMMARY

Motion-damping systems and methods that include motion-damping systems are disclosed herein. The motion-damping systems include a flexible body that is configured to extend within a gap that is defined between a base structure and an attached component. The motion-damping systems further include a magnetic assembly and a ferromagnetic body. One of the magnetic assembly and the ferromagnetic body is located within the flexible body and the other of the magnetic assembly and the ferromagnetic body is operatively affixed to a selected one of the base structure and the attached component. The magnetic assembly and the ferromagnetic body are oriented such that a magnetic force therebetween retains the flexible body in physical contact with the selected one of the base structure and the attached component.

In some embodiments, the motion-damping systems include two magnetic assemblies. In some embodiments, the motion-damping systems include two ferromagnetic bodies. In some embodiments, the motion-damping systems include the ferromagnetic body and an electrically conductive body.

In some embodiments, the ferromagnetic body is located within the flexible body and the magnetic assembly is operatively affixed to one of the base structure and the attached component. In some embodiments, the magnetic assembly is located within the flexible body and the ferromagnetic body is operatively affixed to one of the base structure and the attached component.

In some embodiments, the flexible body defines an enclosed volume. In some embodiments, the enclosed volume contains a viscoelastic material. In some embodiments, the viscoelastic material defines a plurality of voids. In some embodiments, the viscoelastic material is in physical contact with one of the magnetic assembly and the ferromagnetic body.

In some embodiments, the magnetic assembly includes a pair of magnets. In some embodiments, the magnetic assembly further includes a ferromagnetic flux return bar. In some embodiments, the ferromagnetic flux return bar extends between a north pole of one of the pair of magnets and a south pole of the other of the pair of magnets. In some embodiments, the magnetic assembly includes a plurality of pairs of magnets. In some embodiments, the magnetic assembly further includes an electrical insulator that extends between a given pair of magnets and an adjacent pair of magnets.

In some embodiments, the ferromagnetic body includes a plurality of stacked ferromagnetic sheets. In some embodiments, the ferromagnetic body further includes a plurality of stacked electrically conductive sheets that are interleaved with the plurality of ferromagnetic sheets. In some embodiments, an electrically conductive sheet extends between the ferromagnetic body and the magnetic assembly.

In some embodiments, a mechanical system includes the base structure, the attached component, and the motion-dampening system. In some embodiments, the mechanical system is an aircraft. The methods include methods of installing and/or operating the motion-dampening systems.

DESCRIPTION

Figure 1:
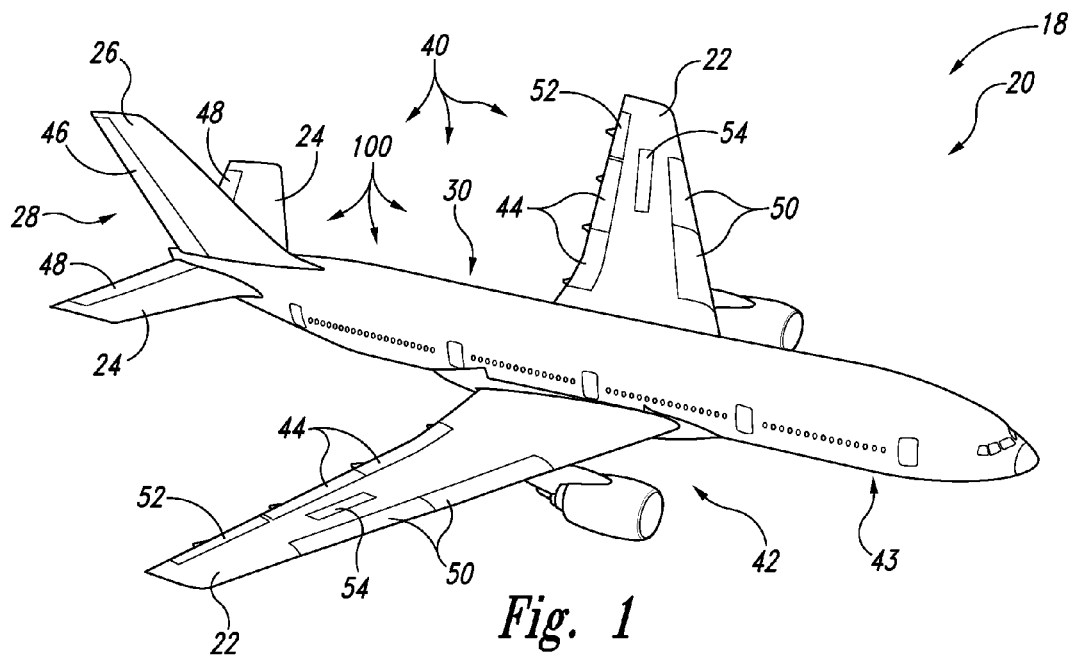
FIG. 1 is a schematic representation of illustrative, non-exclusive examples of an aircraft that may be utilized with and/or include the systems and methods according to the present disclosure.

FIGS. 1-6 provide illustrative, non-exclusive examples of motion-damping systems 100 according to the present disclosure, of mechanical systems 18 that may include and/or utilize motion-damping systems 100, and/or of methods of utilizing motion-damping systems 100. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated there-with may be utilized herein for consistency. Elements, components, and/or features that are discussed herein with reference to one or more of FIGS. 1-6 may be included in and/or utilized with any of FIGS. 1-6 without departing from the scope of the present disclosure.

In general, elements that are likely to be included in a given (i.e., a particular) embodiment and/or method are illustrated in solid lines, while elements that are optional to a given embodiment and/or method are illustrated in dashed lines. However, elements that are shown in solid lines are not essential to all embodiments, and an element shown in solid lines may be omitted from a particular embodiment without departing from the scope of the present disclosure.

FIG. 1 is a schematic representation of illustrative, non-exclusive examples of a mechanical system 18, such as an aircraft 20 that may be utilized with and/or include the systems and methods according to the present disclosure. Aircraft 20 includes wings 22 that are attached to a fuselage 30. Aircraft 20 also includes horizontal stabilizers 24 and a vertical stabilizer 26 that are attached to a tail 28.

Aircraft 20 further includes a plurality of attached components 40. Attached components 40 may be configured to be actuated, to rotate, to translate, and/or to otherwise move relative to a remainder of aircraft 20 and also may be referred to herein as actuated components 40, moving components 40, and/or movable components 40. Attached components 40 may include, be associated with, be operatively attached to, be operatively coupled to, be directly coupled to, and/or be affixed to one or more motion-damping systems 100 according to the present disclosure. Illustrative, non-exclusive examples of actuated components 40 include any suitable main landing gear door 42, nose landing gear door 43, flap 44 (or trailing edge flap 44), rudder 46, elevator 48, slat 50 (or leading edge slat 50), aileron 52, and/or spoiler 54.

Figure 2:
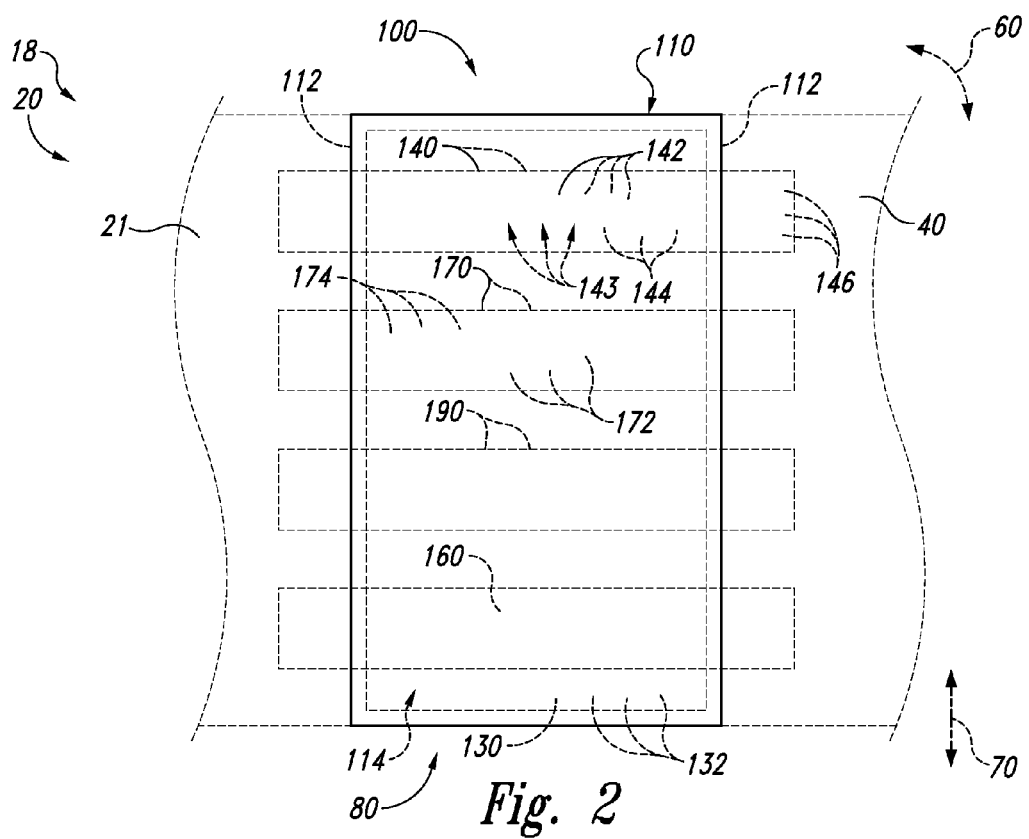
FIG. 2 is a schematic representation of illustrative, non-exclusive examples of a motion-damping system according to the present disclosure.

FIG. 2 is a schematic representation of illustrative, non-exclusive examples of a motion-damping system 100 according to the present disclosure. Motion-damping system 100 may be located within a mechanical system 18, such as an aircraft 20, and is configured to damp relative motion, vibration, and/or flutter between a base structure 21 and an attached component 40 that define a gap 80 therebetween.

Motion-damping system 100 may include and/or be a passive motion-damping system 100. As such, motion-damping system 100 may not include, be associated with, be in communication with, and/or be regulated by a control system. Instead, motion-damping system 100 may be configured to damp the relative motion automatically and/or based upon one or more characteristics of the various components of motion-damping system 100.

Stated another way, motion-damping system 100 may not be actively controlled. Additionally or alternatively, motion-damping system 100 may not be electrically powered, may not be electrically actuated, may not include electrical components, may be free of electrical components, and/or may be free of electrically actuated components. However, these are not required in all embodiments.

As discussed, conventional motion-damping systems may include and/or be hydraulic motion-damping systems. In addition, and as also discussed, such conventional motion-damping systems may be large, heavy, expensive to install, and/or expensive to maintain. With this in mind, motion-damping systems 100 according to the present disclosure may not include hydraulic components, may be free of hydraulic components, may not be hydraulically powered, and/or may not be hydraulic motion-damping systems.

Motion-damping system 100 includes a flexible body 110 that extends within gap 80 when motion-damping system 100 is present within mechanical system 18. Flexible body 110 generally is in physical contact with base structure 21 and attached component 40, and may be referred to herein as forming a fluid seal between base structure 21 and attached component 40.

Motion-damping system 100 further includes at least one magnetic assembly 140 and at least one ferromagnetic body 170. Magnetic assembly 140 is illustrated in dashed lines in FIG. 1 to indicate that magnetic assembly 140 may be present in and/or operatively affixed to any suitable portion of mechanical system 18. As an illustrative, non-exclusive example, magnetic assembly 140 may be present within and/or may be operatively affixed to base structure 21. As another illustrative, non-exclusive example, magnetic assembly 140 may be present within and/or operatively affixed to attached component 40. As yet another illustrative, non-exclusive example, magnetic assembly 140 may be present within and/or operatively affixed to flexible body 110.

Similarly, ferromagnetic body 170 also is illustrated in dashed lines in FIG. 1 to indicate that ferromagnetic body 170 may be present in and/or operatively affixed to any suitable portion of mechanical system 18. As an illustrative, non-exclusive example, ferromagnetic body 170 may be present within and/or operatively affixed to base structure 21. As another illustrative, non-exclusive example, ferromagnetic body 170 may be present within and/or operatively affixed to attached component 40. As yet another illustrative, non-exclusive example, ferromagnetic body 170 may be present within and/or operatively affixed to flexible body 110.

Regardless of an exact location of magnetic assembly 140 and/or of ferromagnetic body 170 within mechanical system 18 and/or within motion-damping system 100 thereof, magnetic assembly 140 and ferromagnetic body 170 may be oriented, or oriented relative to each other, such that a magnetic force therebetween holds and/or retains flexible body 110 in physical contact with a selected one of base structure 21 and attached component 40. As an illustrative, non-exclusive example, one of magnetic assembly 140 and ferromagnetic body 170 may be located within flexible body 110 and the other of magnetic assembly 140 and ferromagnetic body 170 may be operatively affixed to the selected one of base structure 21 and attached component 40.

As a more specific but still illustrative, non-exclusive example, magnetic assembly 140 may be located within flexible body 110 and ferromagnetic body 170 may be operatively affixed to the selected one of base structure 21 and attached component 40. As another more specific but still illustrative, non-exclusive example, magnetic assembly 140 may be operatively affixed to the selected one of base structure 21 and attached component 40 and ferromagnetic body 170 may be located within flexible body 110. When ferromagnetic body 170 is located within flexible body 110, ferromagnetic body 170 may be configured to translate within (or relative to) flexible body 110. Alternatively, a location of ferromagnetic body 170 may be fixed within (or relative to) flexible body 110.

As discussed in more detail herein, it is within the scope of the present disclosure that motion (such as a translation 70 and/or a rotation 60) of attached component 40 relative to base structure 21 from a neutral orientation may produce deformation of flexible body 110. This may include deformation of flexible body 110 from a first orientation to a second orientation. This deformation may occur when the magnetic force between magnetic assembly 140 and ferromagnetic body 170 is sufficient to restrict relative motion, or slipping, of flexible body 110 relative to the selected one of base structure 21 and attached component 40 within a contact region therebetween during the motion.

Under these conditions, the deformation of flexible body 110 may dissipate energy, which may produce damping of the motion. Additionally or alternatively, and as discussed in more detail herein, flexible body 110 may include, contain, and/or be a viscoelastic material. As such, and upon deformation of flexible body 110, flexible body 110 may generate a restoring force, which may tend to (or which may be directed to) return attached component 40 to the neutral orientation. Under these conditions, motion-damping system 100 may be referred to herein as providing, or functioning as, a hinge spring within mechanical system 18.

As also discussed in more detail herein, it is also within the scope of the present disclosure that motion (such as translation 70 and/or rotation 60) of attached component 40 relative to base structure 21 from the neutral orientation may produce relative motion between magnetic assembly 140 and ferromagnetic body 170. This may occur with or without deformation of flexible body 110, such as may depend on a magnitude of the magnetic force between magnetic assembly 140 and ferromagnetic body 170. Under these conditions, frictional drag between flexible body 110 and the selected one of base structure 21 and attached component 40 may dissipate energy, thereby damping relative motion therebetween. In addition, and since ferromagnetic body 170 is electrically conductive, this relative motion also may generate eddy currents within ferromagnetic body 170. These eddy currents may induce a magnetic field that may oppose the relative motion, thereby dissipating additional energy and also damping the relative motion.

It is within the scope of the present disclosure that the components of motion-damping system 100 may be designed, selected, and/or oriented to provide, or produce, a desired amount of energy dissipation and/or a desired amount of motion damping during motion of attached component 40 relative to base structure 21. As an illustrative, non-exclusive example, the magnitude of the magnetic force between magnetic assembly 140 and ferromagnetic body 170 may be designed, selected, and/or regulated to produce a desired amount of deformation of flexible body 110. This desired amount of deformation may produce at least a portion of the desired amount of energy dissipation and/or the desired amount of damping.

As another illustrative, non-exclusive example, the magnitude of the magnetic force may be designed, selected, and/or regulated to produce a desired amount of relative motion between flexible body 110 and the selected one of base structure 21 and attached component 40 during motion of attached component 40 relative to base structure 21. This desired amount of relative motion may produce at least a portion of the desired amount of energy dissipation and/or the desired amount of damping via eddy current generation, as discussed.

As yet another illustrative, non-exclusive example, one or more additional components, such as one or more additional magnets 160 and/or one or more electrically conductive bodies 190 may be included within motion-damping system 100. These one or more additional components may be designed, selected, and/or oriented to produce at least a portion of the desired amount of energy dissipation and/or the desired amount of damping and are discussed in more detail herein.

As illustrated in dashed lines in FIG. 2, mechanical system 18 and/or motion-damping system 100 thereof may include one or more mounting structures 112. Mounting structures 112 may be configured to operatively affix flexible body 110 to base structure 21 and/or to attached component 40, thereby restricting relative motion between flexible body 110 and base structure 21 and/or attached component 40 within the contact region. As an illustrative, non-exclusive example, magnetic assembly 140 and ferromagnetic body 170 may retain flexible body 110 in contact with the selected one of base structure 21 and attached component 40, while mounting structure 112 may operatively affix flexible body 110 to the other of base structure 21 and attached component 40. As another illustrative, non-exclusive example, mounting structure 112 may not operatively affix flexible body 110 to the selected one of base structure 21 and attached component 40. Illustrative, non-exclusive examples of mounting structures 112 include any suitable adhesive and/or fastener.

As discussed, motion-damping system 100 includes at least one magnetic assembly 140 and at least one ferromagnetic body 170. As an illustrative, non-exclusive example, motion-damping system 100 may include two magnetic assemblies 140, such as a first magnetic assembly and a second magnetic assembly. In addition, motion-damping system 100 also may include two ferromagnetic bodies 170, such as a first ferromagnetic body and a second ferromagnetic body. When motion-damping system 100 includes two magnetic assemblies 140 and two ferromagnetic bodies 170, the first magnetic assembly and the first ferromagnetic body may be oriented such that a first magnetic force therebetween retains flexible body 110 in contact with base structure 21. Thus, the first magnetic assembly may be oriented adjacent to and/or in magnetic communication with the first ferromagnetic body.

In addition, the second magnetic assembly and the second ferromagnetic body may be oriented such that a second magnetic force therebetween retains flexible body 110 in contact with attached component 40. Thus, the second magnetic assembly may be oriented adjacent to and/or in magnetic communication with the second ferromagnetic body. Under these conditions, motion-damping system 100 may not include, or may not be required to include, mounting structure 112.

As discussed, motion-damping system 100 also may include one or more additional components. As an illustrative, non-exclusive example, motion-damping system 100 may include two magnetic assemblies 140, such as the first magnetic assembly and the second magnetic assembly. In addition, motion-damping system 100 also may include electrically conductive body 190. In this configuration, the first magnetic assembly and ferromagnetic body 170 may be oriented such that a magnetic force therebetween retains flexible body 110 in contact with the selected one of base structure 21 and attached component 40. Thus, the first magnetic assembly may be oriented adjacent to and/or in magnetic communication with ferromagnetic body 170.

In addition, the second magnetic assembly and electrically conductive body 190 may be oriented such that an eddy current generated within electrically conductive body 190 due to relative motion between electrically conductive body 190 and the second magnetic assembly resists motion of flexible body 110 relative to the other of base structure 21 and attached component 40. Thus, the second magnetic assembly may be oriented adjacent to and/or in magnetic communication with electrically conductive body 190.

Additional magnet 160, when present, may be located, sized, selected, and/or oriented to increase the magnetic force between magnetic assembly 140 and ferromagnetic body 170. As an illustrative, non-exclusive example, additional magnet 160 may be located such that ferromagnetic body 170 extends between magnetic assembly 140 and additional magnet 160. As another illustrative, non-exclusive example, additional magnet 160 may be located proximal to and/or in direct physical contact with ferromagnetic body 170. As yet another illustrative, non-exclusive example, additional magnet 160 may be oriented such that additional magnet 160 is attracted to magnetic assembly 140. As a further illustrative, non-exclusive example, additional magnet 160 may be oriented to generate an additional magnetic force that compresses ferromagnetic body 170 between magnetic assembly 140 and additional magnet 160. More specific but still illustrative, non-exclusive examples of locations and/or orientations of additional magnet 160 are discussed herein.

Flexible body 110 may define any suitable shape, profile, and/or cross-sectional shape. As illustrative, non-exclusive examples, flexible body 110 may define a tubular shape and/or a hollow cylindrical shape. As additional illustrative, non-exclusive examples, flexible body 110 may define a circular cross-sectional shape, an at least substantially circular cross-sectional shape, and/or a non-circular cross-sectional shape before and/or after being located within mechanical system 18. As yet another illustrative, non-exclusive example, flexible body 110 may include and/or be an elongate flexible body that defines a longitudinal axis that is (at least substantially) parallel to gap 80. Additionally or alternatively, and when attached component 40 is configured to rotate relative to base structure 21, the longitudinal axis may be at least substantially parallel to (or may be) a hinge axis for rotational relative motion (i.e., rotation 60) between base structure 21 and attached component 40.

Flexible body 110 may include and/or be formed from any suitable material. As an illustrative, non-exclusive example, flexible body 110 may be formed from a flexible material. As additional illustrative, non-exclusive examples, flexible body 110 may be formed from a polymer, a hydrocarbon polymer, a silicone, and/or silicone rubber.

At least a portion of flexible body 110 may be formed from, may be reinforced by, and/or may include a woven material. The woven material may increase a durability and/or an abrasion resistance of flexible body 110, thereby increasing a service life thereof. Illustrative, non-exclusive examples of the woven material include a glass fiber, an e-glass, a carbon fiber, a polymer, a polymer fiber, and/or a poly-paraphelylene terephthalamide.

When flexible body 110 includes the woven material, the woven material may be coated with a flexible coating. Illustrative, non-exclusive examples of the flexible coating include a polymer, a hydrocarbon polymer, a silicone, and/or silicone rubber.

It is within the scope of the present disclosure that flexible body 110 may be a solid flexible body 110 that is (at least substantially) free of voids, pockets, and/or void spaces. However, it is also within the scope of the present disclosure that flexible body 110 includes, or defines, one or more voids, pockets, and/or void spaces. As an illustrative, non-exclusive example, flexible body 110 may define an enclosed volume 114.

When flexible body 110 defines enclosed volume 114, enclosed volume 114 may include and/or contain a viscoelastic material 130. Illustrative, non-exclusive examples of viscoelastic material 130 include any suitable polymer, high density polyethylene, rubber, silicone, silicone rubber, and/or polyurethane. Viscoelastic material 130 may be (at least substantially) free of voids. Alternatively, viscoelastic material 130 may include and/or define one or more voids 132 therein. Voids 132, when present, may be located, selected, and/or sized to convey a desired amount of viscoelasticity to viscoelastic material 130. This may permit the viscoelasticity of viscoelastic material 130, and thus an amount of energy that may be dissipated via deformation of viscoelastic material 130, to be controlled, regulated, and/or selected to provide a desired level of damping by motion-damping system 100.

It is within the scope of the present disclosure that viscoelastic material 130 may be at least substantially (chemically) similar to flexible body 110, to the flexible material that defines flexible body 110, and/or to the flexible coating material that may coat and/or form a portion of flexible body 110. However, it is also within the scope of the present disclosure that viscoelastic material 130 may be chemically different from flexible body 110, the flexible material, and/or the flexible coating material.

When flexible body 110 defines enclosed volume 114, a selected one of magnetic assembly 140 and ferromagnetic body 170 may be located within enclosed volume 114, while the other of magnetic assembly 140 and ferromagnetic body 170 may be external to enclosed volume 114. Thus, and when enclosed volume 114 contains viscoelastic material 130, viscoelastic material 130 may be in contact with, in direct contact with, in physical contact with, and/or in direct physical contact with the selected one of magnetic assembly 140 and ferromagnetic body 170.

Magnetic assembly 140 may include any suitable structure that may generate and/or produce the magnetic force between magnetic assembly 140 and ferromagnetic body 170. As an illustrative, non-exclusive example, magnetic assembly 140 may include one or more magnets 142. Illustrative, non-exclusive examples of magnets 142 include any suitable permanent magnet, superconducting magnet, and/or electromagnet. Illustrative, non-exclusive examples of the permanent magnet include a neodymium permanent magnet (i.e., a NdFeB permanent magnet), a Samarium-Cobalt permanent magnet (i.e., a SmCo permanent magnet), and/or a ferrite permanent magnet.

When magnetic assembly 140 includes the plurality of magnets 142, the plurality of magnets 142 may define any suitable orientation relative to one another, relative to gap 80, relative to flexible body 110, and/or relative to ferromagnetic body 170. Illustrative, non-non-exclusive examples of suitable relative orientations are discussed in more detail herein.

In addition, and when magnetic assembly 140 includes the plurality of magnets 142, magnetic assembly 140 also may include one or more ferromagnetic flux return bars 144 and/or one or more electrical insulators 146. Ferromagnetic flux return bars 144, when present, may extend between oppositely polarized poles of two magnets 142. This may increase a magnitude of a magnetic force between the two magnets and ferromagnetic body 170. Electrical insulators 146, when present, may electrically separate a first portion of the plurality of magnets 142 from a second portion of the plurality of magnets 142. This may prevent an electric current, such as may be generated by lightening striking mechanical system 18, from propagating along a length of magnetic assembly 140. More specific but still illustrative, non-exclusive examples of ferromagnetic flux return bars 144 and/or of electrical insulators 146, and configurations thereof, are discussed herein.

Ferromagnetic body 170 may include any suitable material of construction that may be attracted to a magnetic field that is generated by magnetic assembly 140. As illustrative, non-exclusive examples, ferromagnetic body 170 may include and/or be formed from a ferromagnetic material, iron, a ferrite, silicon-ferrite, an iron-cobalt-vanadium alloy, a nickel alloy, and/or a magnetic alloy.

Ferromagnetic body 170 also may define any suitable form, shape, size, and/or conformation. The form, shape, size, and/or conformation of ferromagnetic body 170 may be selected and/or based, at least in part, on a desired magnitude of the magnetic force between magnetic assembly 140 and ferromagnetic body 170 and/or on a desired level of flexibility of ferromagnetic body 170. As illustrative, non-exclusive examples, ferromagnetic body 170 may include and/or be a flexible ferromagnetic sheet 172 and/or a plurality of stacked flexible ferromagnetic sheets 172. As another illustrative, non-exclusive example, ferromagnetic body 170 may include a plurality of stacked electrically conductive sheets 174 (such as may be defined by electrically conductive body 190) that are interleaved with the plurality of flexible ferromagnetic sheets 172. As yet another illustrative, non-exclusive example, motion-damping system 100 may include an electrically conductive sheet 174 (such as may be defined by electrically conductive body 190) that is located between and/or that extends between ferromagnetic body 170 and magnetic assembly 140.

Ferromagnetic flux return bar 144 may include and/or be formed from any suitable material. As illustrative, non-exclusive examples, ferromagnetic flux return bar 144 may include and/or be formed from a ferromagnetic material, iron, a ferrite, silicon-ferrite, an iron-cobalt-vanadium alloy, a nickel alloy, and/or a magnetic alloy.

Electrically conductive body 190 may include any suitable structure that may be electrically conductive but that may not be magnetically attracted to magnetic assembly 140. As such, relative motion between magnetic assembly 140 and electrically conductive body 190 may generate eddy currents that may induce a magnetic field that may interact with a magnetic field of magnetic assembly 140, thereby resisting the relative motion. However, electrically conductive body 190 may not, generally, be magnetically attracted to magnetic assembly 140. Electrically conductive body 190 may be formed from any suitable material, illustrative, non-exclusive examples of which include a metal, copper, and/or aluminum. In addition, electrically conductive body 190 may define any suitable shape and/or form, such as a flexible conductive sheet.

Base structure 21 may include any suitable structure that may be operatively attached to attached component 40. As illustrative, non-exclusive examples, base structure 21 may include and/or be a vehicle, an automobile, a portion of an automobile, a train, a portion of a train, an aircraft, a portion of an aircraft, a wing of an aircraft, a horizontal stabilizer of an aircraft, and/or a vertical stabilizer of an aircraft.

Attached component 40 may include any suitable structure that may be attached to base structure 21 and/or that may be moved relative to base structure 21. As illustrative, non-exclusive examples, attached component 40 may include and/or be a window, a hood, a door, a trunk, a flap, a main landing gear door, a nose landing gear door, a front landing gear door, a rudder, an elevator, a slat, an aileron, and/or a spoiler.

Figure 3:
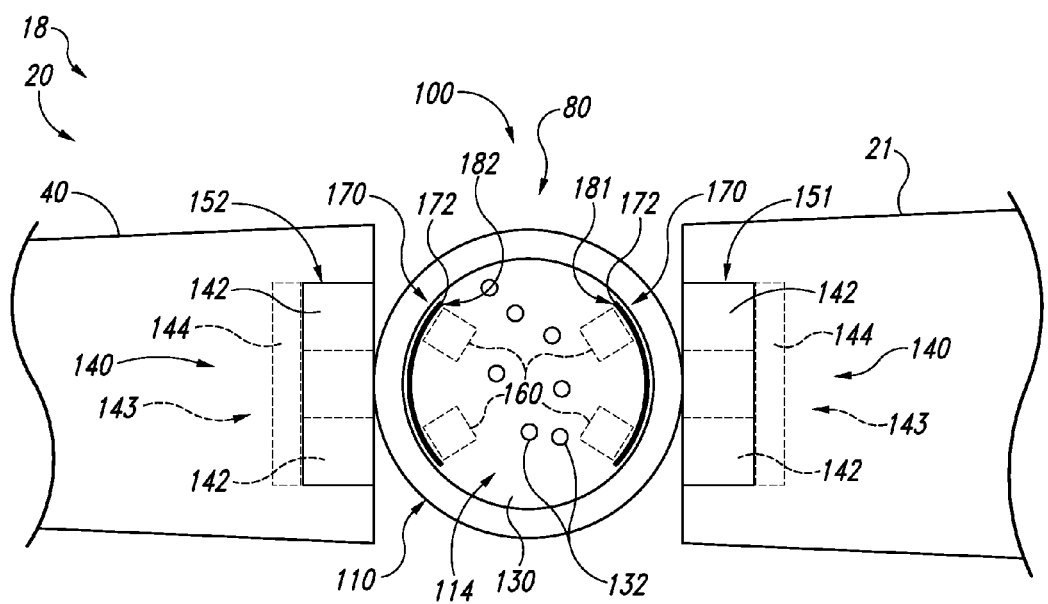
FIG. 3 is another schematic representation of illustrative, non-exclusive examples of a motion-damping system according to the present disclosure.

FIG. 3 is another schematic representation of illustrative, non-exclusive examples of a motion-damping system 100 according to the present disclosure that may form a portion of a mechanical system 18. In FIG. 3, mechanical system 18 is an aircraft 20, base structure 21 is a wing of aircraft 20, and attached component 40 is a flap of aircraft 20, with the wing and the flap defining a gap 80 therebetween. However, motion-damping system 100 of FIG. 3 is not limited to this embodiment.

As illustrated, motion-damping system 100 includes a flexible body 110 that is located within gap 80 and that is in contact with both base structure 21 and attached component 40. Flexible body 110 defines an enclosed volume 114 that contains a viscoelastic material 130 and has a generally tubular and/or hollow cylindrical shape. Viscoelastic material 130 defines a plurality of voids 132 therein. Enclosed volume 114 further contains two ferromagnetic bodies 170, which also may be referred to herein as a first ferromagnetic body 181 and a second ferromagnetic body 182, in the form of flexible ferromagnetic sheets 172. Ferromagnetic bodies 170 are spaced apart from one another within enclosed volume 114.

Motion-damping system 100 also includes two magnetic assemblies 140, which also may be referred to herein as a first magnetic assembly 151 and a second magnetic assembly 152. First magnetic assembly 151 is operatively affixed to base structure 21, while second magnetic assembly 152 is operatively affixed to attached component 40. In addition, and as illustrated, first magnetic assembly 151 and first ferromagnetic body 181 are oriented such that a first magnetic force that extends therebetween retains flexible body 110 in contact with base structure 21. Furthermore, and as also illustrated, second magnetic assembly 152 and second ferromagnetic body 182 are oriented such that a second magnetic force that extends therebetween retains flexible body 110 in contact with attached component 40.

Magnetic assemblies 140 may include a single magnet 142 or a plurality of magnets 142. Magnets 142 may define a north pole and a south pole. When magnetic assembly 140 includes a single magnet 142, the single magnet may be oriented such that both the north pole and the south pole thereof are directed generally toward a corresponding ferromagnetic body 170. Alternatively, the single magnet also may be oriented such that one of the north pole and the south pole is directed generally toward corresponding ferromagnetic body 170, with the other of the north pole and the south pole being directed generally away from corresponding ferromagnetic body 170.

When magnetic assemblies 140 include a plurality of magnets 142, the magnets may be arranged in pairs 143 of magnets 142, and magnetic assembly 140 also may include a ferromagnetic flux return bar 144. Under these conditions, a first north pole of a first magnet 142 of the pair 143 of magnets 142 may be oriented generally toward a corresponding ferromagnetic body 170 and/or away from ferromagnetic flux return bar 144. In addition, a second south pole of a second magnet 142 may be oriented generally toward the corresponding ferromagnetic body 170 and/or away from ferromagnetic flux return bar 144.

Furthermore, the first south pole of first magnet 142 may be directed generally toward ferromagnetic flux return bar 144 and/or away from the corresponding ferromagnetic body 170. In addition, the second north pole of second magnet 142 may be directed generally toward ferromagnetic flux return bar 144 and/or away from corresponding ferromagnetic body 170. Thus, ferromagnetic flux return bar 144 may extend generally between the first south pole and the second north pole.

Each magnetic assembly 140 of FIG. 3 is illustrated as optionally including a single pair 143 of magnets 142. However, it is within the scope of the present disclosure that magnetic assemblies 140 may include a plurality of pairs 143 of magnets 142, as discussed in more detail herein.

FIG. 3 further illustrates that motion-damping system 100 also may include one or more additional magnets 160. In the illustrative, non-exclusive example of FIG. 3, additional magnets 160 are located within enclosed volume 114 and are oriented such that they are magnetically attracted to corresponding magnetic assemblies 140. Thus, the addition of additional magnets 160 may increase a magnetic force that retains flexible body 110 in contact with base structure 21 and/or with attached component 40.

As discussed, motion-damping system 100 may damp relative motion between base structure 21 and attached component 40 utilizing a variety of damping (or energy dissipating) mechanisms. As an illustrative, non-exclusive example, a magnitude of the first magnetic force may be selected to be sufficient to restrict and/or resist motion and/or slipping of flexible body 110 relative to base structure 21 within a contact region therebetween during motion of attached component 40 relative to base structure 21. In addition, a magnitude of the second magnetic force may be selected to be sufficient to restrict and/or resist motion and/or slipping of flexible body 110 relative to attached component 40 within a contact region therebetween during motion of attached component 40 relative to base structure 21. Under these conditions, the motion may produce deformation of flexible body 110 and/or of viscoelastic material 130. This deformation may dissipate energy, thereby damping the motion.

As another illustrative, non-exclusive example, the magnitude of the second magnetic force and/or the magnitude of the first magnetic force may be selected to be insufficient to prevent motion and/or slipping of flexible body 110 relative to base structure 21 and/or attached component 40, respectively. Under these conditions, the motion and/or slipping may generate eddy currents within first ferromagnetic body 181 and/or within second ferromagnetic body 182, and these eddy currents may dissipate energy, thereby damping the motion.

Figure 4:
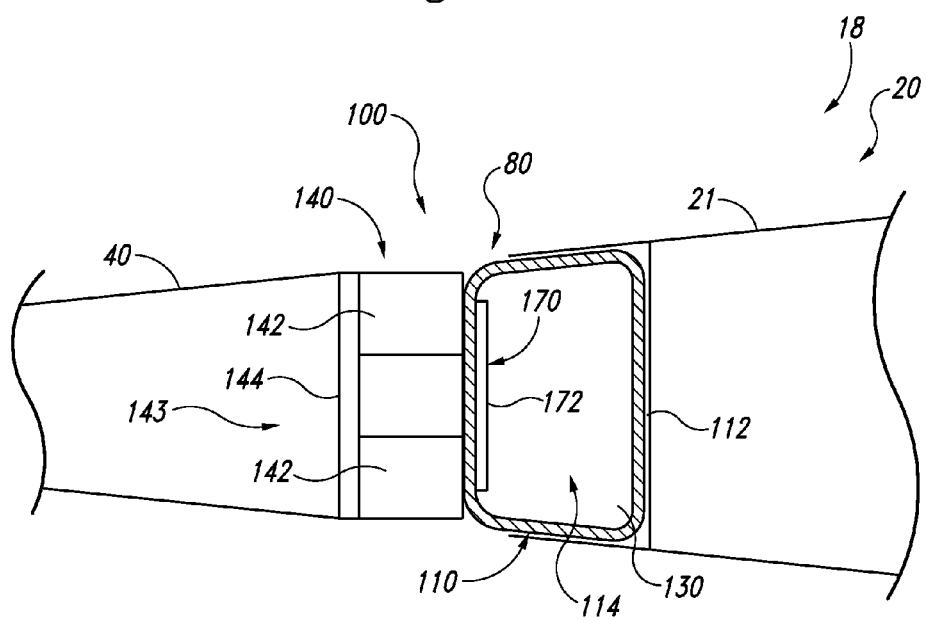
FIG. 4 is another schematic representation of illustrative, non-exclusive examples of a motion-damping system according to the present disclosure.

FIG. 4 is another schematic representation of illustrative, non-exclusive examples of a motion-damping system 100 according to the present disclosure that may form a portion of a mechanical system 18. In FIG. 4, and similar to FIG. 3, mechanical system 18 is an aircraft 20, base structure 21 is a wing of aircraft 20, and attached component 40 is a flap of aircraft 20, with the wing and the flap defining a gap 80 therebetween. However, motion-damping system 100 of FIG. 4 is not limited to this embodiment.

In FIG. 4 motion-damping system 100 includes a flexible body 110 in the form of a tubular but non-cylindrical flexible body 110. Flexible body 110 defines an enclosed volume 114 that contains a viscoelastic material 130. In addition, a ferromagnetic body 170, in the form of a flexible ferromagnetic sheet 172, is located within enclosed volume 114.

Motion-damping system 100 further includes a magnetic assembly 140, with magnetic assembly 140 and ferromagnetic body 170 being oriented such that a magnetic force therebetween retains flexible body 110 in contact with attached component 40. Magnetic assembly 140 includes a pair 143 of magnets 142 and a ferromagnetic flux return bar 144.

In contrast with motion-damping system 100 of FIG. 3, motion-damping system 100 of FIG. 4 does not include a second magnetic assembly 140 and associated ferromagnetic body 170 to retain flexible body 110 in contact with base structure 21. Instead, motion-damping system 100 of FIG. 4 includes a mounting structure 112 that operatively affixes flexible body 110 to base structure 21 and prevents relative motion within a contact region therebetween.

The operation, energy dissipation mechanisms, and/or damping mechanisms of motion-damping system 100 of FIG. 4 may be at least substantially similar to the operation, energy dissipation mechanisms, and/or damping mechanisms of motion-damping system 100 of FIG. 3. However, motion-damping system 100 of FIG. 4 may not permit relative motion, or slipping, in the contact region between flexible body 110 and base structure 21.

Figure 5:
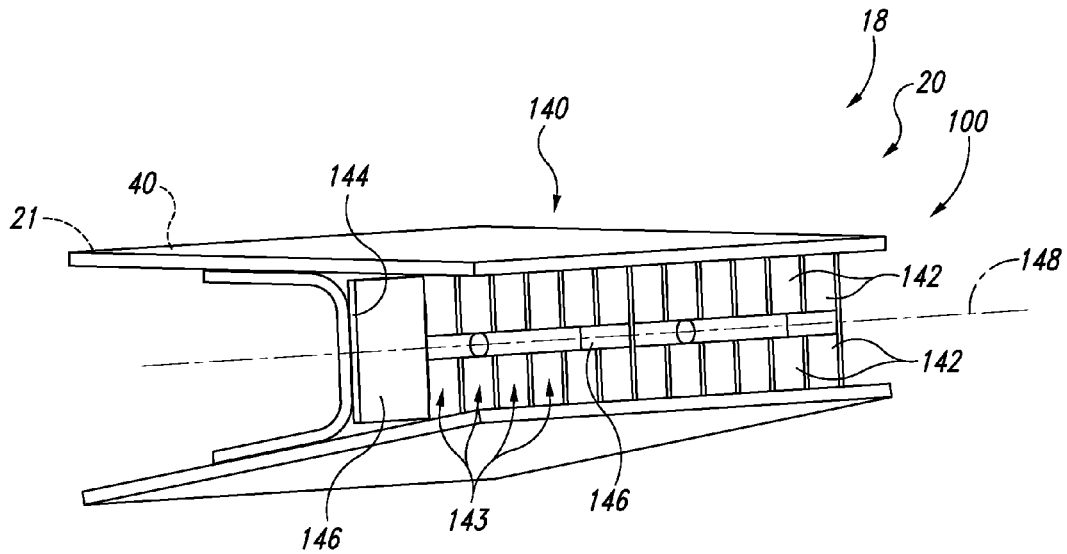
FIG. 5 is a schematic representation of illustrative, non-exclusive examples of a portion of a motion-damping system according to the present disclosure.

FIG. 5 is another schematic representation of illustrative, non-exclusive examples of a portion of a motion-damping system 100 according to the present disclosure. Specifically, FIG. 5 provides an illustrative, non-exclusive example of a configuration of a magnetic assembly 140 that may form a portion of motion-damping system 100.

In FIG. 5, magnetic assembly 140 includes a plurality of magnets 142 that are arranged to form a plurality of pairs 143 of magnets 142. Each of the plurality of pairs 143 of magnets 142 includes, is associated with, and/or is in magnetic communication with a ferromagnetic flux return bar 144. In addition, each pair 143 of magnets 142 includes a first magnet that defines a first south pole that is directed generally toward ferromagnetic flux return bar 144 and a second magnet that defines a second north pole that is directed generally toward ferromagnetic flux return bar 144. Thus, each pair 143 of magnets 142 includes a first north pole that is directed generally away from ferromagnetic flux return bar 144 and a second south pole that is directed generally away from ferromagnetic flux return bar 144.

In the illustrative, non-exclusive example of FIG. 5, the plurality of pairs 143 of magnets 142 is aligned along a longitudinal axis 148, and this longitudinal axis may be parallel to and/or may be a longitudinal axis of a gap that is defined between a base structure 21 and an attached component 40 when magnetic assembly 100 is assembled within a system (such as mechanical system 18 of FIGS. 1-4). It is within the scope of the present disclosure that a polarity of a given pair 143 of magnets 142 may be (at least substantially) the same as a polarity of an adjacent pair 143 of magnets 142 within magnetic assembly 140. Alternatively, it is also within the scope of the present disclosure that the polarity of the given pair 143 of magnets 142 may be (at least substantially) opposed to the polarity of the adjacent pair of magnets 142 within magnetic assembly 140.

FIG. 5 also illustrates that magnetic assembly 140 further may include one or more electrical insulators 146. Electrical insulators 146 may extend between a given pair 143 of magnets 142 and an adjacent pair 143 of magnets 142, thereby resisting a flow of electric current therebetween, as discussed in more detail herein.

Figure 6:
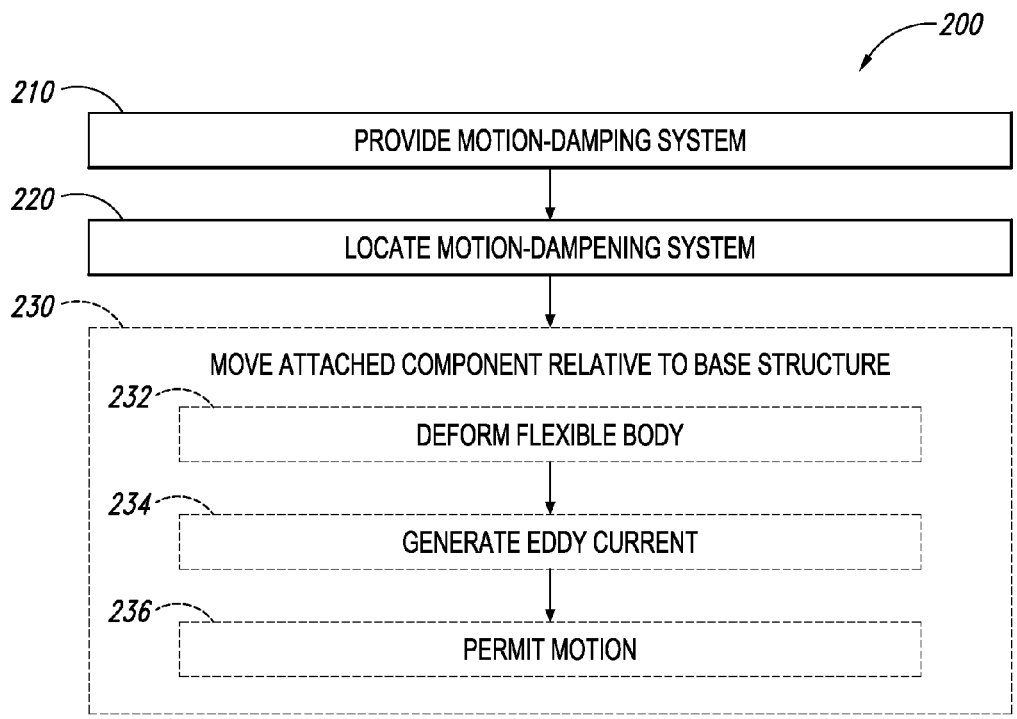
FIG. 6 is a flowchart depicting methods according to the present disclosure of damping motion between a base structure and an attached component.

FIG. 6 is a flowchart depicting methods 200 according to the present disclosure of damping motion between a base structure and an attached component. Methods 200 include providing a motion-damping system at 210 and locating the motion-damping system within a gap that is defined between a base structure and an attached component at 220. Methods 200 further may include rotating the attached component relative to the base structure at 230.

Providing the motion-damping system at 210 may include providing any suitable motion-damping system. As an illustrative, non-exclusive example, the providing at 210 may include providing motion-damping system 100 of FIGS. 1-5. It is within the scope of the present disclosure that the providing at 210 may include fabricating the motion-damping system, constructing the motion-damping system, purchasing the motion-damping system, ordering the motion-damping system, and/or otherwise obtaining the motion-damping system in any suitable manner and/or from any suitable source such that the motion-damping system may be utilized during the locating at 220.

Locating the motion-damping system within the gap that is defined between the base structure and the attached component at 220 may include locating the motion-damping system in any suitable manner. As an illustrative, non-exclusive example, the locating at 220 may include locating such that a flexible body of the motion-damping system extends between and/or is in physical contact with the base structure and the attached component. Illustrative, non-exclusive examples of orientations and/or conformations for the motion-damping system within the gap are discussed herein with reference to FIGS. 2-5.

Moving the attached component relative to the base structure at 230 may include moving the attached component in any suitable manner. As an illustrative, non-exclusive example, the moving at 230 may include rotating and/or pivoting the attached component relative to the base structure. As another illustrative, non-exclusive example, the moving at 230 also may include translating the attached component relative to the base structure. As yet another illustrative, non-exclusive example, the moving at 230 may include both rotating and translating the attached component relative to the base structure.

It is within the scope of the present disclosure that the moving at 230 may include deforming the flexible body at 232. This may include compressing (or placing in compression) at least a portion of the flexible body and/or stretching (or placing in tension) at least a portion of the flexible body. When methods 200 include the deforming at 232, the deforming may include dissipating energy during and/or as a result of the deforming at 232. As an illustrative, non-exclusive example, the flexible body may include, may contain, may be attached to, and/or may be a viscoelastic material, and the viscoelastic material may dissipate the energy when deformed. Illustrative, non-exclusive examples of the flexible body are discussed herein with reference to flexible body 110 of FIGS. 2-5. Illustrative, non-exclusive examples of the viscoelastic material are discussed herein with reference to viscoelastic material 130 of FIGS. 2-5.

Additionally or alternatively, it is also within the scope of the present disclosure that the moving at 230 may include generating, at 234, an eddy current within an electrically conductive body and/or within a ferromagnetic body that forms a portion of the motion-damping system. When methods 200 include the generating at 234, the eddy current may resist motion of the attached component relative to the base structure, thereby dissipating energy and damping motion of the attached component relative to the base structure. Illustrative, non-exclusive examples of the electrically conductive body are discussed herein with reference to electrically conductive body 190 and/or electrically conductive sheet 174 of FIGS. 2-5. Illustrative, non-exclusive examples of the ferromagnetic body are discussed herein with reference to ferromagnetic body 170 and/or flexible ferromagnetic sheet 172 of FIGS. 2-5.

It is also within the scope of the present disclosure that the moving at 230 may include permitting, at 236, the flexible body to move relative to the base structure and/or relative to the attached component. As an illustrative, non-exclusive example, the permitting at 236 may include permitting the flexible body to move, slip, and/or slide relative to the base structure and/or relative to the attached component in a contact region between the flexible body and the base structure and/or the attached component, respectively.

Illustrative, non-exclusive examples of inventive subject matter according to the present disclosure are described in the following enumerated paragraphs:

A1. A motion-damping system that is configured to damp relative motion between a base structure and an attached component, wherein the base structure and the attached component define a gap therebetween, the system comprising:
 a flexible body, wherein the flexible body extends within the gap and is in physical contact with the base structure and with the attached component;
 a magnetic assembly; and
 a ferromagnetic body, wherein:
  (i) one of the magnetic assembly and the ferromagnetic body is located within the flexible body;
  (ii) the other of the magnetic assembly and the ferromagnetic body is operatively affixed to a selected one of the base structure and the attached component; and
  (iii) the magnetic assembly and the ferromagnetic body are oriented such that a magnetic force between the magnetic assembly and the ferromagnetic body retains the flexible body in physical contact with the selected one of the base structure and the attached component.

A2. The system of paragraph A1, wherein the flexible body is not operatively affixed to the selected one of the base structure and the attached component.

A3. The system of any of paragraphs A1-A2, wherein the flexible body is operatively affixed to the other of the base structure and the attached component.

A4. The system of paragraph A1, wherein the magnetic assembly is a first magnetic assembly and the motion-damping system further includes a second magnetic assembly, wherein the ferromagnetic body is a first ferromagnetic body and the motion-damping system further includes a second ferromagnetic body, wherein the first magnetic assembly and the first ferromagnetic body are oriented such that a first magnetic force between the first magnetic assembly and the first ferromagnetic body retains the flexible body in contact with the base structure, and further wherein the second magnetic assembly and the second ferromagnetic body are oriented such that a second magnetic force between the second magnetic assembly and the second ferromagnetic body retains the flexible body in contact with the attached component.

A5. The system of paragraph A4, wherein the first magnetic assembly is oriented adjacent to and in magnetic communication with the first ferromagnetic body, and further wherein the second magnetic assembly is oriented adjacent to and in magnetic communication with the second ferromagnetic body.

A6. The system of any of paragraphs A4-A5, wherein the first magnetic assembly is operatively affixed to the base structure, wherein the second magnetic assembly is operatively affixed to the attached component, wherein the first ferromagnetic body is located within the flexible body, and further wherein the second ferromagnetic body is located within the flexible body and spaced apart from the first ferromagnetic body.

A7. The system of paragraph A1, wherein the magnetic assembly is a first magnetic assembly and the motion-damping system further includes a second magnetic assembly and an electrically conductive body, wherein the first magnetic assembly and the ferromagnetic body are oriented such that a magnetic force between the first magnetic assembly and the ferromagnetic body retains the flexible body in contact with the selected one of base structure and the attached component, and further wherein the second magnetic assembly and the electrically conductive body are oriented such that an eddy current generated within the electrically conductive body by relative motion between the electrically conductive body and the second magnetic assembly resists motion of the flexible body relative to the other of the base structure and the attached component.

A8. The system of paragraph A7, wherein the first magnetic assembly is oriented adjacent to and in magnetic communication with the ferromagnetic body, and further wherein the second magnetic assembly is oriented adjacent to and in magnetic communication with the electrically conductive body.

A9. The system of any of paragraphs A7-A8, wherein the electrically conductive body is formed from at least one of a metal, copper, and aluminum.

A10. The system of any of paragraphs A7-A9, wherein the electrically conductive body includes a flexible conductive sheet.

A11. The system of any of paragraphs A1-A10, wherein the flexible body defines at least one of (i) a tubular shape and (ii) a hollow cylindrical shape.

A12. The system of any of paragraphs A1-A11, wherein the flexible body defines at least one of (i) a circular cross-sectional shape and (ii) a non-circular cross-sectional shape.

A13. The system of any of paragraphs A1-A12, wherein the flexible body includes an elongate flexible body that defines a longitudinal axis that is at least substantially parallel to the gap.

A14. The system of paragraph A13, wherein the longitudinal axis is at least substantially parallel to, and optionally is, a hinge axis for rotational relative motion between the base structure and the attached component.

A15. The system of any of paragraphs A1-A14, wherein the flexible body is formed from a flexible material, optionally wherein the flexible material includes at least one of a polymer and silicone rubber.

A16. The system of any of paragraphs A1-A15, wherein the flexible body is formed from a woven material, optionally wherein the woven material includes at least one of a glass fiber, an e-glass, a carbon fiber, a polymer, and a poly-paraphelylene terephthalamide.

A17. The system of paragraph A16, wherein the woven material is coated with a flexible coating material, optionally wherein the flexible coating material includes at least one of a polymer and silicone rubber.

A18. The system of any of paragraphs A1-A17, wherein the flexible body is at least substantially free of voids.

A19. The system of any of paragraphs A1-A17, wherein the flexible body defines an enclosed volume.

A20. The system of paragraph A19, wherein the enclosed volume contains a viscoelastic material.

A21. The system of paragraph A20, wherein the viscoelastic material includes at least one of a polymer, high density polyethylene, rubber, silicone rubber, and polyurethane.

A22. The system of any of paragraphs A20-A21, wherein the viscoelastic material is at least substantially chemically similar to at least one of (i) the flexible material that defines the flexible body and (ii) the flexible coating material that forms a portion of the flexible body.

A23. The system of any of paragraphs A20-A21, wherein the viscoelastic material is chemically different from at least one of (i) the flexible material that defines the flexible body and (ii) the flexible coating material that forms a portion of the flexible body.

A24. The system of any of paragraphs A20-A23, wherein the viscoelastic material defines a plurality of voids.

A25. The system of any of paragraphs A20-A23, wherein the viscoelastic material is in physical contact with one of, and optionally only one of, the magnetic assembly and the ferromagnetic body.

A26. The system of any of paragraphs A1-A25, wherein the magnetic assembly includes at least one of a permanent magnet, a superconducting magnet, and an electromagnet.

A27. The system of any of paragraphs A1-A26, wherein the magnetic assembly includes a permanent magnet, optionally wherein the permanent magnet includes at least one of a NdFeB permanent magnet, a SmCo permanent magnet, and a ferrite permanent magnet.

A28. The system of any of paragraphs A1-A27, wherein the magnetic assembly includes a magnet that defines a north pole and a south pole, and further wherein the magnet is oriented such that both the north pole and the south pole are directed (at least substantially) toward the ferromagnetic body.

A29. The system of any of paragraphs A1-A27, wherein the magnetic assembly includes a pair of magnets, which includes a first magnet and a second magnet, wherein a first north pole of the first magnet is directed (at least substantially) toward the ferromagnetic body, wherein a first south pole of the first magnet is directed (at least substantially) away from the ferromagnetic body, wherein a second north pole of the second magnet is directed (at least substantially) away from the ferromagnetic body, and further wherein a second south pole of the second magnet is directed (at least substantially) toward the ferromagnetic body.

A30. The system of paragraph A29, wherein the magnetic assembly further includes a ferromagnetic flux return bar, wherein the ferromagnetic flux return bar extends between the first south pole and the second north pole.

A31. The system of paragraph A30, wherein the ferromagnetic flux return bar is formed from a ferromagnetic material.

A32. The system of any of paragraphs A1-A31, wherein the magnetic assembly includes a plurality of pairs of magnets.

A33. The system of paragraph A32, wherein each of the plurality of pairs of magnets includes a corresponding ferromagnetic flux return bar.

A34. The system of any of paragraphs A32-A33, wherein the plurality of pairs of magnets is aligned along a longitudinal axis of the gap.

A35. The system of any of paragraphs A32-A34, wherein a polarity of a given pair of magnets of the plurality of pairs of magnets is the same as a polarity of an adjacent pair of magnets of the plurality of pairs of magnets.

A36. The system of any of paragraphs A32-A34, wherein a polarity of a given pair of magnets of the plurality of pairs of magnets is opposed to a polarity of an adjacent pair of magnets of the plurality of pairs of magnets.

A37. The system of any of paragraphs A29-A36, wherein the magnetic assembly includes an electrical insulator that extends between (i) the given pair of magnets of the plurality of pairs of magnets and (ii) the adjacent pair of magnets of the plurality of pairs of magnets.

A38. The system of any of paragraphs A1-A37, wherein the ferromagnetic body is formed from a ferromagnetic material, optionally wherein the ferromagnetic material includes at least one of iron, a ferrite, silicon-ferrite, an iron-cobalt-vanadium alloy, a nickel alloy, and a magnetic alloy.

A39. The system of any of paragraphs A1-A38, wherein the ferromagnetic body is a flexible ferromagnetic sheet.

A40. The system of any of paragraphs A1-A39, wherein the ferromagnetic body includes a plurality of stacked ferromagnetic sheets.

A41. The system of paragraph A40, wherein the ferromagnetic body further includes a plurality of stacked electrically conductive sheets that are interleaved with the plurality of ferromagnetic sheets.

A42. The system of any of paragraphs A1-A41, wherein the system further includes an electrically conductive sheet that extends between the ferromagnetic body and the magnetic assembly.

A43. The system of any of paragraphs A1-A42, wherein the motion-damping system further includes an additional magnet, wherein the ferromagnetic body extends between the magnetic assembly and the additional magnet.

A44. The system of paragraph A43, wherein the additional magnet is in direct physical contact with the ferromagnetic sheet.

A45. The system of any of paragraphs A43-A44, wherein the additional magnet is oriented to generate an additional magnetic force that compresses the ferromagnetic body between the magnetic assembly and the additional magnet.

A46. The system of any of paragraphs A1-A45, wherein the motion-damping system is not a hydraulic motion-damping system.

A47. The system of any of paragraphs A1-A46, wherein the motion-damping system is free of hydraulic components.

A48. The system of any of paragraphs A1-A47, wherein the motion-damping system is not hydraulically powered.

A49. The system of any of paragraphs A1-A48, wherein the motion-damping system is not actively controlled.

A50. The system of any of paragraphs A1-A49, wherein the motion-damping system is not electrically powered.

A51. The system of any of paragraphs A1-A50, wherein the motion-damping system is free of electrical components.

A52. The system of any of paragraphs A1-A51, wherein the motion-damping system is a passive motion-damping system.

A53. The system of any of paragraphs A1-A52, wherein, when the attached component is rotated relative to the base structure from a neutral orientation, the motion-damping system provides a restoring force that is directed to return the attached component to the neutral orientation.

A54. The system of any of paragraphs A1-A53, wherein the motion-damping system forms a fluid seal between the base structure and the attached component.

A55. The system of any of paragraphs A1-A54, wherein the motion-damping system damps at least one of vibration and flutter between the base structure and the attached component.

A56. The system of any of paragraphs A1-A55, wherein the magnetic assembly is located within the flexible body, and further wherein the ferromagnetic body is operatively affixed to the selected one of the base structure and the attached component.

A57. The system of any of paragraphs A1-A55, wherein the magnetic assembly is operatively affixed to the selected one of the base structure and the attached component, and further wherein the ferromagnetic body is located within the flexible body.

A58. The system of paragraph A57, wherein the ferromagnetic body is configured to translate within the flexible body.

A59. The system of paragraph A57, wherein a location of the ferromagnetic body is fixed with respect to the flexible body.

A60. A mechanical system, comprising:
a base structure;
an attached component, wherein the attached component is attached to the base structure and is configured to move relative to the base structure, and further wherein the base structure and the attached component define a gap therebetween; and
the motion-damping system of any of paragraphs A1-A59.

A61. The mechanical system of paragraph A60, wherein the base structure includes at least one of a vehicle, an automobile, a portion of an automobile, a train, a portion of a train, an aircraft, a portion of an aircraft, a wing of an aircraft, a horizontal stabilizer of an aircraft, and/or a vertical stabilizer of an aircraft.

A62. The mechanical system of any of paragraphs A60-A61, wherein the attached component includes at least one of a window, a hood, a door, a trunk, a flap, a main landing gear door, a nose landing gear door, a front landing gear door, a rudder, an elevator, a slat, an aileron, and a spoiler.

B1. A method of damping motion between a base structure and an attached component, the method comprising:
providing the motion-damping system of any of paragraphs A1-A59; and
locating the motion-damping system within the gap that is defined between the base structure and the attached component such that the flexible body is in physical contact with the base structure and with the attached component.

B2. The method of paragraph B1, wherein the method further includes moving the attached component relative to the base structure.

B3. The method of paragraph B2, wherein the moving includes at least one of translating the attached component relative to the base structure and rotating the attached component relative to the base structure.

B4. The method of any of paragraphs B2-B3, wherein the moving includes deforming the flexible body.

B5. The method of paragraph B4, wherein the deforming includes dissipating energy with the flexible body.

B6. The method of any of paragraphs B2-B5, wherein the moving includes generating an eddy current within at least one of (i) the ferromagnetic body and (ii) the electrically conductive body that forms a portion of the motion-damping system.

B7. The method of paragraph B6, wherein the eddy current resists motion of the attached component relative to the base structure.

B8. The method of any of paragraphs B2-B7, wherein the moving includes at least one of permitting the flexible body to move relative to the base structure and permitting the flexible body to move relative to the attached component.

B9. The method of any of paragraphs B2-B8, wherein the magnetic force permits motion of the flexible body relative to the selected one of the base structure and the attached component.

B10. The method of any of paragraphs B2-B9, wherein the magnetic force resists motion of the flexible body relative to the selected one of the base structure and the attached component.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A mechanical system, comprising:
a base structure;
an attached component, wherein:
(a) the attached component is spaced-apart from the base structure to define a gap therebetween;
(b) the attached component is attached to the base structure; and
(c) the attached component is configured to move relative to the base structure; and
a motion-damping system configured to damp relative motion between the base structure and the attached component, wherein the motion-damping system includes:
(a) a flexible body that extends within the gap, is in physical contact with the base structure and with the attached component, and defines an enclosed volume;
(b) a magnetic assembly; and
(c) a ferromagnetic body, wherein:
(i) one of the magnetic assembly and the ferromagnetic body is located within the enclosed volume of the flexible body;
(ii) the other of the magnetic assembly and the ferromagnetic body is operatively affixed to a selected one of the base structure and the attached component; and
(iii) the magnetic assembly and the ferromagnetic body are oriented such that a magnetic force between the magnetic assembly and the ferromagnetic body retains the flexible body in physical contact with the selected one of the base structure and the attached component.

2. The system of claim 1, wherein the magnetic assembly is a first magnetic assembly and the motion-damping system further includes a second magnetic assembly, wherein the ferromagnetic body is a first ferromagnetic body and the motion-damping system further includes a second ferromagnetic body, wherein the first magnetic assembly and the first ferromagnetic body are oriented such that a first magnetic force between the first magnetic assembly and the first ferromagnetic body retains the flexible body in contact with the base structure, and further wherein the second magnetic assembly and the second ferromagnetic body are oriented such that a second magnetic force between the second magnetic assembly and the second ferromagnetic body retains the flexible body in contact with the attached component.

3. The system of claim 2, wherein the first magnetic assembly is operatively affixed to the base structure, wherein the second magnetic assembly is operatively affixed to the attached component, wherein the first ferromagnetic body is located within the enclosed volume of the flexible body, and further wherein the second ferromagnetic body is located within the enclosed volume of the flexible body and spaced apart from the first ferromagnetic body.

4. The system of claim 1, wherein the magnetic assembly is a first magnetic assembly and the motion-damping system further includes a second magnetic assembly and an electrically conductive body, wherein the first magnetic assembly and the ferromagnetic body are oriented such that a magnetic force between the first magnetic assembly and the ferromagnetic body retains the flexible body in contact with the selected one of the base structure and the attached component, and further wherein the second magnetic assembly and the electrically conductive body are oriented such that an eddy current generated within the electrically conductive body by relative motion between the electrically conductive body and the second magnetic assembly resists motion of the flexible body relative to the other of the base structure and the attached component.

5. The system of claim 1, wherein the flexible body includes an elongate flexible body that defines a longitudinal axis that is at least substantially parallel to the gap.

6. The system of claim 1, wherein the enclosed volume of the flexible body contains a viscoelastic material that is chemically different from a flexible material that defines the flexible body.

7. The system of claim 6, wherein the viscoelastic material is in physical contact with only one of the magnetic assembly and the ferromagnetic body.

8. The system of claim 6, wherein the viscoelastic material defines a plurality of voids.

9. The system of claim 1, wherein the magnetic assembly includes a pair of magnets, which includes a first magnet and a second magnet, wherein a first north pole of the first magnet is directed toward the ferromagnetic body, wherein a first south pole of the first magnet is directed away from the ferromagnetic body, wherein a second north pole of the second magnet is directed away from the ferromagnetic body, and further wherein a second south pole of the second magnet is directed toward the ferromagnetic body.

10. The system of claim 9, wherein the magnetic assembly further includes a ferromagnetic flux return bar, wherein the ferromagnetic flux return bar extends between the first south pole and the second north pole.

11. The system of claim 9, wherein the magnetic assembly includes a plurality of pairs of magnets and an electrical insulator that extends between a given pair of magnets of the plurality of pairs of magnets and an adjacent pair of magnets of the plurality of pairs of magnets.

12. The system of claim 1, wherein the ferromagnetic body includes a plurality of stacked ferromagnetic sheets.

13. The system of claim 12, wherein the ferromagnetic body further includes a plurality of stacked electrically conductive sheets that are interleaved with the plurality of stacked ferromagnetic sheets.

14. The system of claim 1, wherein the system further includes an electrically conductive sheet that extends between the ferromagnetic body and the magnetic assembly.

15. The mechanical system of claim 1, wherein the base structure includes a wing of an aircraft and the attached component includes one of a slat, an aileron, and a spoiler.

16. A method of damping motion between a base structure and an attached component, the method comprising:
 providing the mechanical system of claim 1; and
 locating the mechanical system within the gap such that the flexible body is in physical contact with the base structure and with the attached component.

17. The method of claim 16, wherein the method further includes moving the attached component relative to the base structure.

18. The method of claim 17, wherein the moving includes deforming the flexible body, wherein the deforming includes dissipating energy with the flexible body.

* * * * *